(12) United States Patent
Pandhare et al.

(10) Patent No.: US 12,504,064 B2
(45) Date of Patent: Dec. 23, 2025

(54) PROTECTIVE MEMBER CONFIGURED TO MAINTAIN STRUCTURAL INTEGRITY OF A TRANSFER CASE OF A HYBRID VEHICLE

(71) Applicant: FCA US LLC, Auburn Hills, MI (US)

(72) Inventors: Ranjit B Pandhare, Troy, MI (US); Milind Parab, Troy, MI (US); Vikas Sanghavi, Farmington Hills, MI (US); Meyyappan Valliappan, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/652,894

(22) Filed: May 2, 2024

(65) Prior Publication Data

US 2025/0341248 A1 Nov. 6, 2025

(51) Int. Cl.
*F16H 57/03* (2012.01)
*F16H 57/02* (2012.01)

(52) U.S. Cl.
CPC ... *F16H 57/03* (2013.01); *F16H 2057/02052* (2013.01)

(58) Field of Classification Search
CPC ........... F16H 57/03; F16H 2057/02052
See application file for complete search history.

(56) References Cited

U.S. PATENT DOCUMENTS

| | | | | |
|---|---|---|---|---|
| 4,326,445 | A * | 4/1982 | Bemiss | B62D 25/2072 89/36.02 |
| 6,220,380 | B1 * | 4/2001 | Mita | B60K 1/04 180/65.1 |
| 11,351,850 | B1 * | 6/2022 | Calandruccio | B60K 1/00 |
| 2019/0263449 | A1 * | 8/2019 | Ta | B62D 27/06 |

FOREIGN PATENT DOCUMENTS

JP 2005088819 A * 4/2005 ......... Y10T 10/7072

* cited by examiner

*Primary Examiner* — Thomas C Diaz
(74) *Attorney, Agent, or Firm* — Jeremy J. Klobucar

(57) ABSTRACT

A vehicle that includes a propulsion system configured to drive at least one wheel of the vehicle; a high-voltage component electrically connected to the propulsion system by a high-voltage cable; a transfer case having a housing connected to the propulsion system and positioned between the propulsion system and the high-voltage component; a drive shaft connected to the transfer case; and a protective plate fixed to the housing between the transfer case and the high-voltage component; wherein in the event of the vehicle experiencing a collision event that transfers a force of the collision through the drive shaft to the transfer case that is sufficient to crack the housing, the protective plate is configured to maintain structural integrity of the housing of the transfer case.

18 Claims, 4 Drawing Sheets

PROTECTIVE MEMBER CONFIGURED TO MAINTAIN STRUCTURAL INTEGRITY OF A TRANSFER CASE OF A HYBRID VEHICLE

FIELD

The present disclosure relates to a protective member that is configured to maintain structural integrity of a transfer case of a hybrid vehicle.

BACKGROUND

This section provides background information related to the present disclosure which is not necessarily prior art.

Vehicles are currently being manufactured that may include an internal combustion engine (ICE) drivetrain, a battery-powered drivetrain, or a combination of an ICE drivetrain and battery-powered drivetrain (i.e., hybrid). Because hybrid vehicles include a combination of an ICE drivetrain and a battery-powered drivetrain, hybrid vehicles can be much heavier in comparison to vehicles that include only an ICE drivetrain or a battery-powered drivetrain. This additional mass can lead to components of the hybrid vehicle being exposed to greater forces during a collision event.

Specifically, when some types of hybrid vehicles are subjected to high speed driver side small overlap (DSORB) impact testing, there have been instances where the forces generated during such an impact are sufficient to cause the structure of a transfer case of the hybrid vehicle to fail. When the structure of the transfer case fails, there is a potential for sharp edges to be formed. This is significant because hybrid vehicles include high-voltage components that are connected to various components of the vehicle by high-voltage wires. If a sharp edge is formed due to structural failure of the transfer case, a possibility arises where the sharp edges could cut, sever, or pinch one of the high-voltage wires, which is undesirable.

SUMMARY

This section provides a general summary of the disclosure, and is not a comprehensive disclosure of its full scope or all of its features.

According to a first aspect of the present disclosure, there is provided a vehicle that includes a propulsion system configured to drive at least one wheel of the vehicle; a high-voltage component electrically connected to the propulsion system by a high-voltage cable; a transfer case having a housing connected to the propulsion system and positioned between the propulsion system and the high-voltage component; a drive shaft connected to the transfer case; and a protective plate fixed to the housing between the transfer case and the high-voltage component; wherein in the event of the vehicle experiencing a collision event that transfers a force of the collision through the drive shaft to the transfer case that is sufficient to crack the housing, the protective plate is configured to maintain structural integrity of the housing of the transfer case.

According to the first aspect, the protective plate includes a planar section and a flange extending outward from the planar section.

According to the first aspect, the planar section includes a plurality of apertures configured for receipt of fasteners that are configured to mate with threaded bores formed in the housing of the transfer case.

According to the first aspect, the vehicle also includes a frame configured to support the propulsion system, the high-voltage component, and the transfer case, wherein the frame includes a pair of longitudinally extending rails that are connected to each other by at least one cross-bar member positioned between the transfer case and the high-voltage component, and the flange is configured to contact the at least one cross-bar member during the collision event to maintain a spacing between the cross-bar member and the transfer case to prevent or minimize the high-voltage cable from being pinched or severed by contact between the transfer case and the cross-bar member.

According to the first aspect, the flange includes a first section extending orthogonally outward from the planar section, and a second section connected to the first section that extends orthogonally outward from the first section.

According to the first aspect, the propulsion system includes each of an internal combustion engine and an electric drive module.

According to the first aspect, the drive shaft extends between the electric drive module and the transfer case.

According to the first aspect, the vehicle also includes a battery pack in communication with the high-voltage component.

According to the first aspect, the protective plate is configured to maintain structural integrity of the housing of the transfer case such that the housing does not break apart during the collision event.

According to the first aspect, the protective plate being configured to maintain structural integrity of the housing of the transfer case such that the housing does not break apart during the collision event minimizes sharp edges along the crack from damaging the at least one high-voltage cable.

According to the first aspect, the protective plate is formed of a rigid metal material.

According to a second aspect of the present disclosure, there is provided a vehicle that includes a frame including a pair of longitudinally extending rails that are connected by at least one cross-bar member; an internal combustion engine supported by the frame configured to drive at least one wheel connected to the frame; an electric drive module supported by the frame and configured to drive the at least one wheel connected to the frame; a battery pack configured to provide electric power to each of the internal combustion engine and the electric drive module via a plurality of high-voltage cables; a transfer case having a housing and connected to the internal combustion engine by a first drive shaft and the electric drive module by a second drive shaft; and a protective plate fixed to the housing between the transfer case and the battery pack; wherein in the event of the vehicle experiencing a collision event that transfers a force of the collision through the second drive shaft to the transfer case that is sufficient to crack the housing, the protective plate is configured to maintain structural integrity of the housing of the transfer case.

According to the second aspect, the protective plate includes a planar section and a flange extending outward from the planar section.

According to the second aspect, the planar section includes a plurality of apertures configured for receipt of fasteners that are configured to mate with threaded bores formed in the housing of the transfer case.

According to the second aspect, the at least one cross-bar member is positioned between the transfer case and the battery pack, and the flange is configured to contact the at least one cross-bar member during the collision event to maintain a spacing between the cross-bar member and the transfer case to prevent or minimize the high-voltage cable from being pinched or severed by contact between the transfer case and the cross-bar member.

According to the second aspect, the flange includes a first section extending orthogonally outward from the planar section, and a second section connected to the first section that extends orthogonally outward from the first section.

According to the second aspect, the protective plate is configured to maintain structural integrity of the housing of the transfer case such that the housing does not break apart during the collision event.

According to the second aspect, the protective plate is configured to maintain structural integrity of the housing of the transfer case such that the housing does not break apart during the collision event minimizes sharp edges along the crack from damaging the at least one high-voltage cable.

According to the second aspect, the protective plate is formed of a rigid metal material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
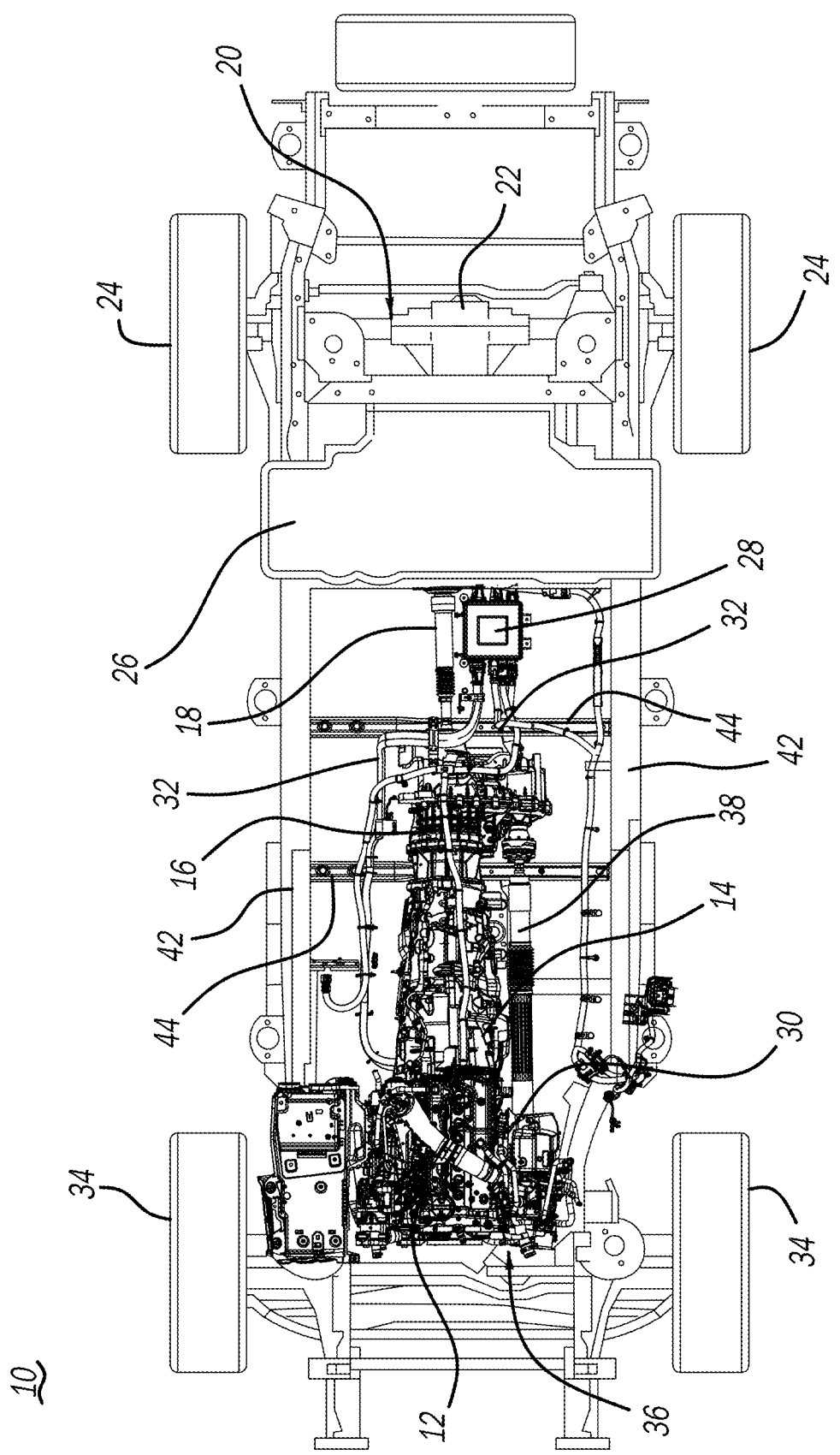
FIG. 1 is a top-perspective view of a frame of a vehicle that supports an internal combustion engine drivetrain and a battery-pack powered drivetrain.

FIG. 1 schematically illustrates a vehicle 10 according to a principle of the present disclosure. Vehicle 10 includes an internal combustion engine (ICE) 12, a transmission 14 attached to the ICE 12, a transfer case 16 attached to transmission 14, a first drive shaft 18 attached to transfer case 16, a rear axle assembly 20 including a rear differential 22 attached to first drive shaft 18 that transfers rotation of first drive shaft 18 to at least one of a pair of rear wheels 24 that are attached to the rear axle assembly 20.

Vehicle 10 additionally includes a battery pack 26 that houses a plurality of battery cells (not shown) that can provide electric power to a high-voltage component 28 such as, for example, an inverter. High voltage component 28 can be connected to various other components of vehicle 10 such as an electric drive module 30 using high-voltage cables 32. Electric drive module 30 can be used to drive, for example, at least one of a pair of front wheels 34 that are connected to a front axle assembly 36. Alternatively or in addition to, electric drive module 30 can be used to drive at least one of the pair of rear wheels 24 via a second drive shaft 38 that is attached to transfer case 16.

Figure 2:
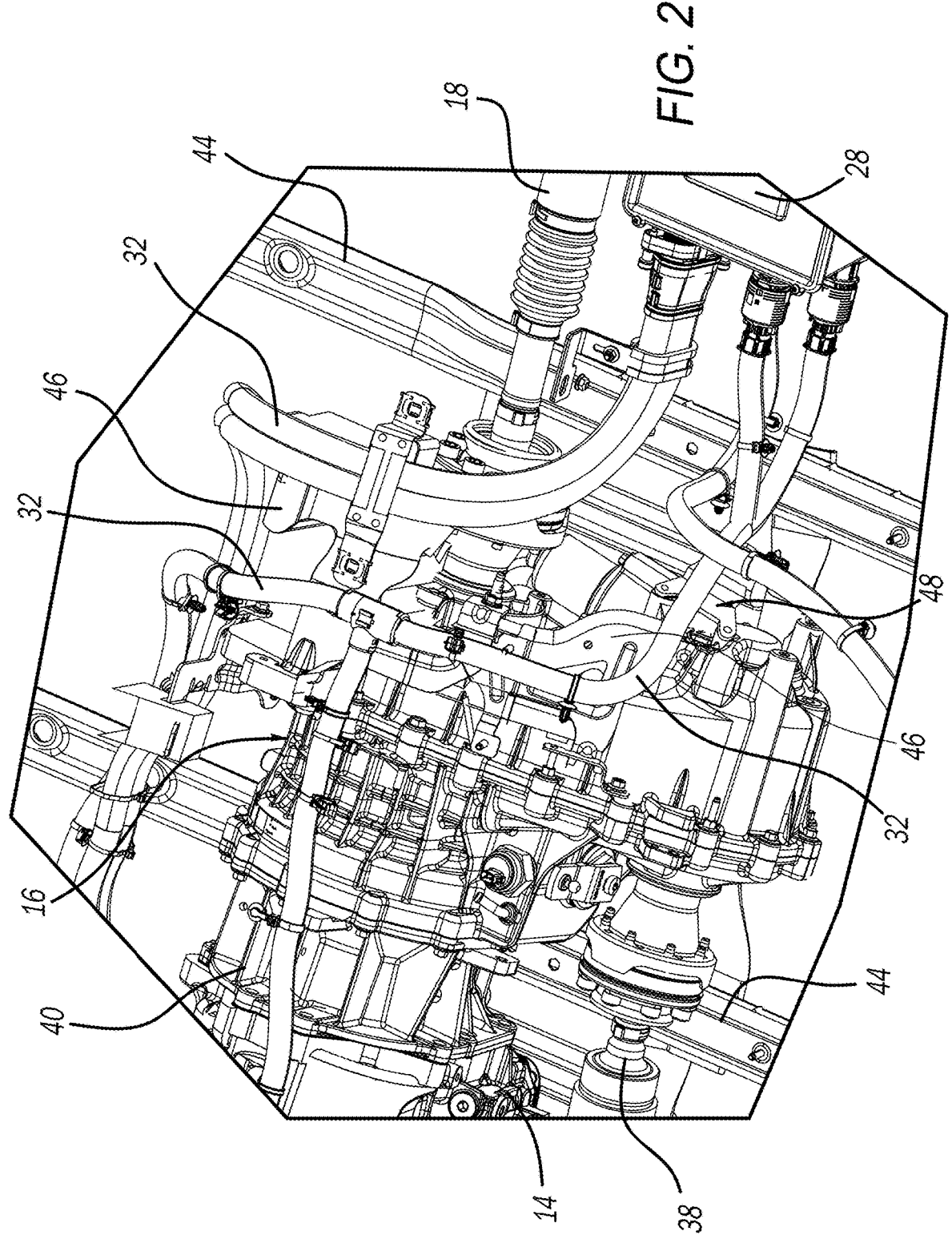
FIG. 2 is an isometric perspective view of a transfer case of the vehicle illustrated in FIG. 1, having a protective member according to a principle of the present disclosure attached thereto.

Now referring to FIG. 2, transfer case 16 is shown in greater detail relative to other components of vehicle 10 described above. Transfer case 16 includes a housing 40 formed of a rigid metal material such as, for example, steel or aluminum. Housing 40 encloses various power transfer mechanisms (not shown) that assist in transferring energy provided by either ICE 12 or electric drive module 30 to at least one of the first and second drive shafts 18 and 38, and then to the wheels 24, 34. Transfer case 16 is supported by a pair of frame members 42 (FIG. 1) that are connected by a plurality of cross-bar members 44.

In the illustrated embodiment, transfer case 16 is positioned between high-voltage component 28 and transmission 14. Inasmuch as transfer case 16 is positioned near high-voltage component 28 and battery pack 26, the high-voltage cables 32 are routed over transfer case 16 using various wiring brackets 46 that are attached to housing 40.

Figure 4:
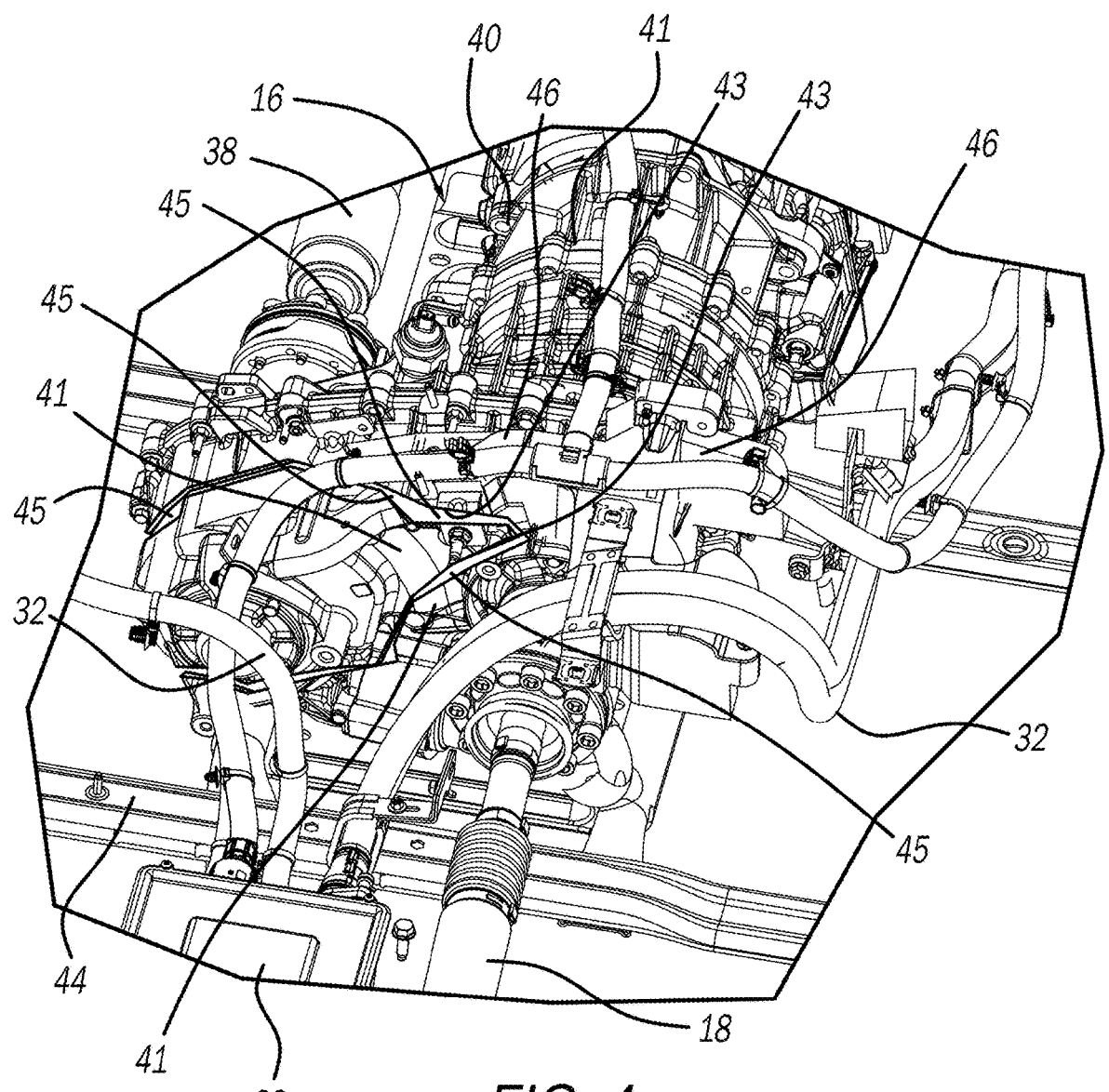
FIG. 4 is a rear perspective view of a transfer case that does not include a protective member attached thereto that has cracked and exposed sharp edges during a collision event that may sever high-voltage cables located proximate the transfer case.

In the event that vehicle 10 is involved in a collision such as, for example, a high-speed driver side small overlap (DSORB) impact, the force of the collision can be transferred by second drive shaft 38 to transfer case 16. If the force transferred by second drive shaft 38 to transfer case 16 is significant, the force may cause housing 40 of transfer case 16 to crack or shatter (FIG. 4). In such a case, portions 41 of the metal housing 40 can form sharp edges 43 that can potentially cut or sever high-voltage cables 32. Moreover, even if transfer case 16 does not crack or shatter, there is a possibility that transfer case 16 can be forced in a direction back toward high-voltage component 28 and battery pack 26. In such a case, one of the high-voltage cables 32 could potentially be pinched between transfer case 16 and one of the cross-bar members 44, which may also cut or sever the high-voltage cable 32. In either case, it is not desirable for high-voltage cables 32, high voltage component 28, or battery pack 26 to be damaged by transfer case 16 in the event of a frontal collision.

Figure 3:
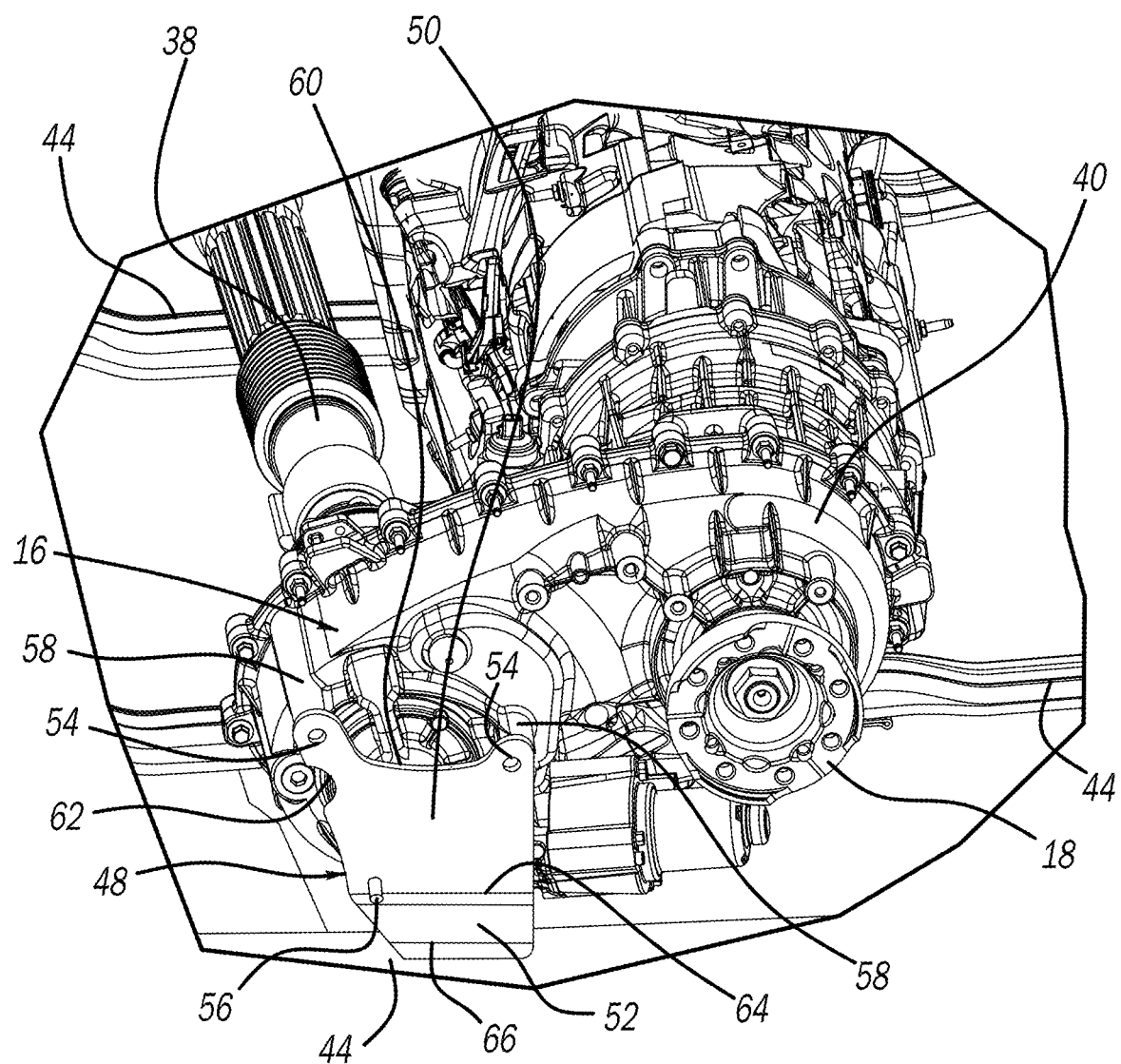
FIG. 3 is a rear perspective view of the transfer case illustrated in FIG. 2, having the protective member attached thereto.

Thus, to prevent or at least substantially minimize damage to high-voltage cables 32, high-voltage component 28, or battery pack 26, a protective member or plate 48 is attached to transfer case 16 as best shown in FIG. 3. Protective plate 48 may be formed of a rigid metal material such as steel, aluminum, or any other type of metal material known to one skilled in the art. In the illustrated embodiment, protective plate 48 includes a planar section 50 and a flange 52 that extends outward from the planar section 50. A thickness of protective plate 48 can range between 2 mm to 5 mm.

Planar section 50 includes a plurality of apertures 54 that are configured for receipt of a fastener 56 such that protective plate 48 can be directly attached to transfer case 16.

More particularly, it should be understood that transfer case 16 may have threaded bores 58 that are configured to be aligned with the apertures 54, and fasteners 56 pass through apertures 54 before threadingly engaging with the threaded bores 58 to fix protective plate 48 to transfer case 16.

When protective plate 48 is fixed to transfer case 16 in this manner and a force applied to transfer case 16 by, for example, second drive shaft 38 during a collision event is sufficient to crack or shatter housing 40 of transfer case 16, the protective plate 48 being fixed to housing 40 of transfer case 16 is configured to maintain the structural integrity of housing 40. Put another way, if housing 40 cracks or shatters, protective plate 48 is configured to hold housing 40 together so that the portions 41 of housing 40 on opposite sides of any cracks 45 (FIG. 4) that may develop do not separate and expose potentially sharp edges 43 thereof to the high-voltage cables 32 positioned proximate transfer case 16. Inasmuch as protective plate 48 is designed to maintain structural integrity of housing 40, the locations of apertures 54 may be selected to be sufficiently spaced apart from each other such that if cracks 45 develop at different locations of transfer case 16, there is a greater likelihood that the structural integrity of housing 40 is maintained.

It should be understood that the overall shape of protective plate 48 is not necessarily an important feature of protective plate 48. Rather, protective plate 48 can be designed with various packaging considerations in mind that may be unique to the type of vehicle 10 where protective plate 48 is implemented. Thus, protective plate 48 may have various recesses 60 or cut-outs 62, as desired.

As noted above, protective plate 48 may include a flange 52. Flange 52 includes a first section 64 that may extend substantially orthogonal to planar section 50 and a second section 66 that extends substantially orthogonally outward from first section 64. Similar to the overall shape of protective plate 48, the orientation and dimensions of flange 52 relative to planar section 50 is not necessarily important. Rather, the important aspect to keep in mind is that flange 52 is designed to contact cross-bar member 44 in the event that transfer case 16 is forced in a direction toward cross-bar member 44 during a collision event. By having flange 52 be configured to contact cross-bar member 44 during a collision event, a sufficient spacing can be maintained between the transfer case 16 and the cross-bar 44. The sufficient spacing is important from the aspect that if a high-voltage cable 32 is present between cross-bar 44 and transfer case 16, contact between cross-bar 44 and transfer case 16 that could pinch or potentially sever high-voltage cables 32 is avoided or at least minimized.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
   a propulsion system configured to drive at least one wheel of the vehicle;
   a high-voltage component electrically connected to the propulsion system by a high-voltage cable;
   a transfer case having a housing connected to the propulsion system and positioned between the propulsion system and the high-voltage component;
   a drive shaft connected to the transfer case; and
   a protective plate fixed to the housing between the transfer case and the high-voltage component;
   wherein the protective plate includes a planar section and a flange extending outward from the planar section, and
   wherein in the event of the vehicle experiencing a collision event that transfers a force of the collision through the drive shaft to the transfer case that is sufficient to crack the housing, the protective plate is configured to maintain structural integrity of the housing of the transfer case.

2. The vehicle according to claim 1, wherein the planar section includes a plurality of apertures configured for receipt of fasteners that are configured to mate with threaded bores formed in the housing of the transfer case.

3. The vehicle according to claim 1, further comprising a frame configured to support the propulsion system, the high-voltage component, and the transfer case, the frame including a pair of longitudinally extending rails that are connected to each other by at least one cross-bar member positioned between the transfer case and the high-voltage component,
   wherein the flange is configured to contact the at least one cross-bar member during the collision event to maintain a spacing between the cross-bar member and the transfer case to prevent or minimize the high-voltage cable from being pinched or severed by contact between the transfer case and the cross-bar member.

4. The vehicle according to claim 3, wherein the flange includes a first section extending orthogonally outward from the planar section, and a second section connected to the first section that extends orthogonally outward from the first section.

5. The vehicle according to claim 1, wherein the propulsion system includes each of an internal combustion engine and an electric drive module.

6. The vehicle according to claim 5, wherein the drive shaft extends between the electric drive module and the transfer case.

7. The vehicle according to claim 5, further comprising a battery pack in communication with the high-voltage component.

8. The vehicle according to claim 1, wherein the protective plate is configured to maintain structural integrity of the housing of the transfer case such that the housing does not break apart during the collision event.

9. The vehicle according to claim 8, wherein the protective plate being configured to maintain structural integrity of the housing of the transfer case such that the housing does not break apart during the collision event minimizes sharp edges along the crack from damaging the at least one high-voltage cable.

10. The vehicle according to claim 1, wherein the protective plate is formed of a rigid metal material.

11. A vehicle comprising:
    a frame including a pair of longitudinally extending rails that are connected by at least one cross-bar member;
    an internal combustion engine supported by the frame configured to drive at least one wheel connected to the frame;
    an electric drive module supported by the frame and configured to drive the at least one wheel connected to the frame;

a battery pack configured to provide electric power to each of the internal combustion engine and the electric drive module via a plurality of high-voltage cables;

a transfer case having a housing and connected to the internal combustion engine by a first drive shaft and the electric drive module by a second drive shaft; and a protective plate fixed to the housing between the transfer case and the battery pack;

wherein in the event of the vehicle experiencing a collision event that transfers a force of the collision through the second drive shaft to the transfer case that is sufficient to crack the housing, the protective plate is configured to maintain structural integrity of the housing of the transfer case.

12. The vehicle according to claim 11, wherein the protective plate includes a planar section and a flange extending outward from the planar section.

13. The vehicle according to claim 12, wherein the planar section includes a plurality of apertures configured for receipt of fasteners that are configured to mate with threaded bores formed in the housing of the transfer case.

14. The vehicle according to claim 12, wherein the at least one cross-bar member is positioned between the transfer case and the battery pack, wherein the flange is configured to contact the at least one cross-bar member during the collision event to maintain a spacing between the cross-bar member and the transfer case to prevent or minimize the high-voltage cable from being pinched or severed by contact between the transfer case and the cross-bar member.

15. The vehicle according to claim 14, wherein the flange includes a first section extending orthogonally outward from the planar section, and a second section connected to the first section that extends orthogonally outward from the first section.

16. The vehicle according to claim 11, wherein the protective plate is configured to maintain structural integrity of the housing of the transfer case such that the housing does not break apart during the collision event.

17. The vehicle according to claim 16, wherein the protective plate being configured to maintain structural integrity of the housing of the transfer case such that the housing does not break apart during the collision event minimizes sharp edges along the crack from damaging the at least one high-voltage cable.

18. The vehicle according to claim 11, wherein the protective plate is formed of a rigid metal material.

* * * * *